(12) United States Patent
Lin et al.

(10) Patent No.: US 8,181,103 B2
(45) Date of Patent: May 15, 2012

(54) ANNOTATION DETECTION AND ANCHORING ON INK NOTES

(75) Inventors: Zhouchen Lin, Beijing (CN); Mingqing Xu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1301 days.

(21) Appl. No.: 11/275,398

(22) Filed: Dec. 29, 2005

(65) Prior Publication Data

US 2007/0157076 A1    Jul. 5, 2007

(51) Int. Cl.
*G06F 17/00* (2006.01)
(52) U.S. Cl. ....................................................... 715/230
(58) Field of Classification Search .................... 715/230
See application file for complete search history.

(56) References Cited

U.S. PATENT DOCUMENTS

| | | | |
|---|---|---|---|
| 5,832,474 A * | 11/1998 | Lopresti et al. | 707/2 |
| 6,279,014 B1 * | 8/2001 | Schilit et al. | 715/234 |
| 6,529,215 B2 * | 3/2003 | Golovchinsky et al. | 715/764 |
| 7,259,753 B2 * | 8/2007 | Keely et al. | 345/179 |
| 7,283,670 B2 * | 10/2007 | Wakeam et al. | 382/186 |
| 2004/0021701 A1 * | 2/2004 | Iwema et al. | 345/863 |
| 2004/0255242 A1 * | 12/2004 | Price et al. | 715/512 |
| 2005/0289452 A1 * | 12/2005 | Kashi et al. | 715/512 |

OTHER PUBLICATIONS

Golovchinsky, et al., 2002, "Moving markup: repositioning freeform annotations", In Proceedings of the 15th annual ACM symposium on User interface software and technology (UIST '02), ACM, New York, NY, USA, 21-30.*

* cited by examiner

*Primary Examiner* — Amelia Rutledge
(74) *Attorney, Agent, or Firm* — Lee & Hayes, PLLC

(57) ABSTRACT

Systems and methods for detecting annotation digital ink strokes and further associating annotation digital ink strokes with word digital ink strokes are presented. Ink strokes are captured on a writing surface and then classified as words or annotations. Annotations are then anchored to corresponding words. When words are relocated or edited on the writing surface, the anchored annotations are also relocated and may even be reshaped according to the changes in the anchored words.

18 Claims, 5 Drawing Sheets

1. Select Rules Alerts from the Tools menu
2. click on the (Inbox)
3. Click on New Rule to Launch the Rules Wizard
   o if you want to use a template with pre-defined actions and conditions, click start creating a rule from a template.
   o if you want to use custom conditions and

Figure 4

ANNOTATION DETECTION AND ANCHORING ON INK NOTES

BACKGROUND

Computer users are accustomed to using a mouse and keyboard as a way of interacting with a personal computer. While personal computers provide a number of advantages over printed documents, users often continue to perform certain functions using printed paper. Some of these functions include reading handwritten documents. In the case of annotations, the printed document assumes a greater significance because of the annotations placed on it by the user. One of the difficulties, however, with having a hand-written document is a later need to have the content entered back into the electronic form of the document. This requires the original user or another user to wade through the handwritten content and enter them into a personal computer. In some cases, a user will scan in the handwritten content and the original text, thereby creating a new document. These multiple steps make the interaction between the printed document and the electronic version of the document difficult to handle on a repeated basis. Further, scanned-in images are frequently non-modifiable. There may be no way to separate the handwritten content from the original text. This makes using the handwritten content difficult. Accordingly, an improved way of handling handwritten content is needed.

Tablet PC's are increasingly being used to capture and display handwritten content. In the context of taking notes during a meeting, for example, a Tablet PC presents less of a barrier between individuals than does a laptop computer. Tablet PC's also allow for capturing of handwritten notes so that Tablet PC users are able to take notes in their own handwriting, in an unobtrusive manner similar to taking handwritten notes with a pen and paper.

Tablet PC's capture and display digital ink. The term "digital ink" refers to one or more strokes that are recorded from a pointing device, such as a mouse, a stylus/pen on a digitizer tablet, or a stylus/pen on a display screen integrated with a digitizer tablet (e.g., a touch-sensitive display screen). As used herein, the term "ink" is shorthand for digital ink.

Documents displayed on writing surfaces of tablet PCs may be annotated by a user. Correspondingly, annotations such as underline and blobs are often incorporated within the document. For example, a user may underline a few words in a document to emphasize the words underlined. Thus, extraction of handwritten annotations plays an important role in document processing.

SUMMARY

An input device is used to enter a plurality of digital ink strokes on a writing surface, such as a Tablet PC screen. Digital ink strokes are captured and may then be classified. The digital ink strokes may be classified as word ink strokes and annotation ink strokes. Annotation ink strokes are anchored to corresponding word ink strokes. When word ink strokes are relocated on the writing surface, the anchored annotation ink strokes are also relocated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 4 shows a document having modified annotation positions, in accordance with an embodiment of the invention.

DETAILED DESCRIPTION

Figure 1:
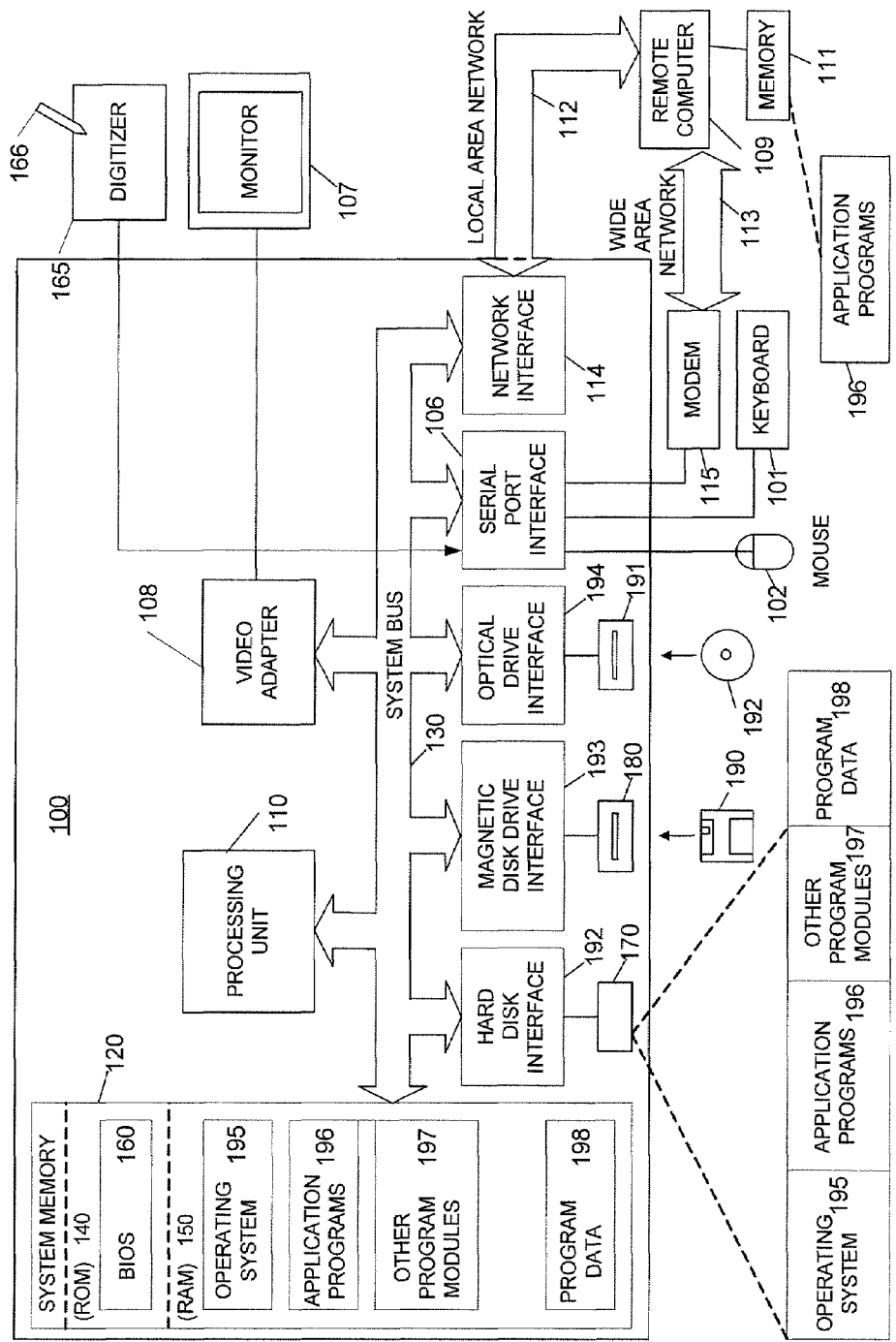
FIG. 1 is a functional block diagram of an example of a conventional general-purpose digital computing environment that can be used to implement various aspects of the present invention.

Aspects of the present invention relate to classifying annotation digital ink strokes and anchoring the annotation digital ink strokes with word digital ink strokes. FIG. 1 is a functional block diagram of an example of a conventional general-purpose Tablet PC digital computing environment that can be used to process a writing input from a Pen (e.g., stylus 166). As used herein, the term Tablet PC refers to, by way of example, without limitation, a full-function "MICROSOFT" "WINDOWS" operating system-based personal computer incorporating various convenient and intuitive aspects of pencil and paper into a user's interaction with a PC. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

In an embodiment, a writing surface, such as a pen digitizer 165, and accompanying pen or stylus 166 are provided in order to digitally capture freehand input to provide a writing input (e.g., a handwritten document) for processing unit 110. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

Aspects of the invention relate to annotation detection and anchoring. An annotation may be in the form of an underline, blob or any other annotation, e.g. callout, that a user would add to a document. An underline, for example, refers to a stroke or a series of strokes drawn under lines of a document. An underline annotates the words above the underline. A blob consists of one or more digital ink strokes that form a closed pattern. A blob may encloses words, table, an image or other elements of a document. A blob annotates the words or other elements surrounded by the digital ink strokes(s).

Figure 2:
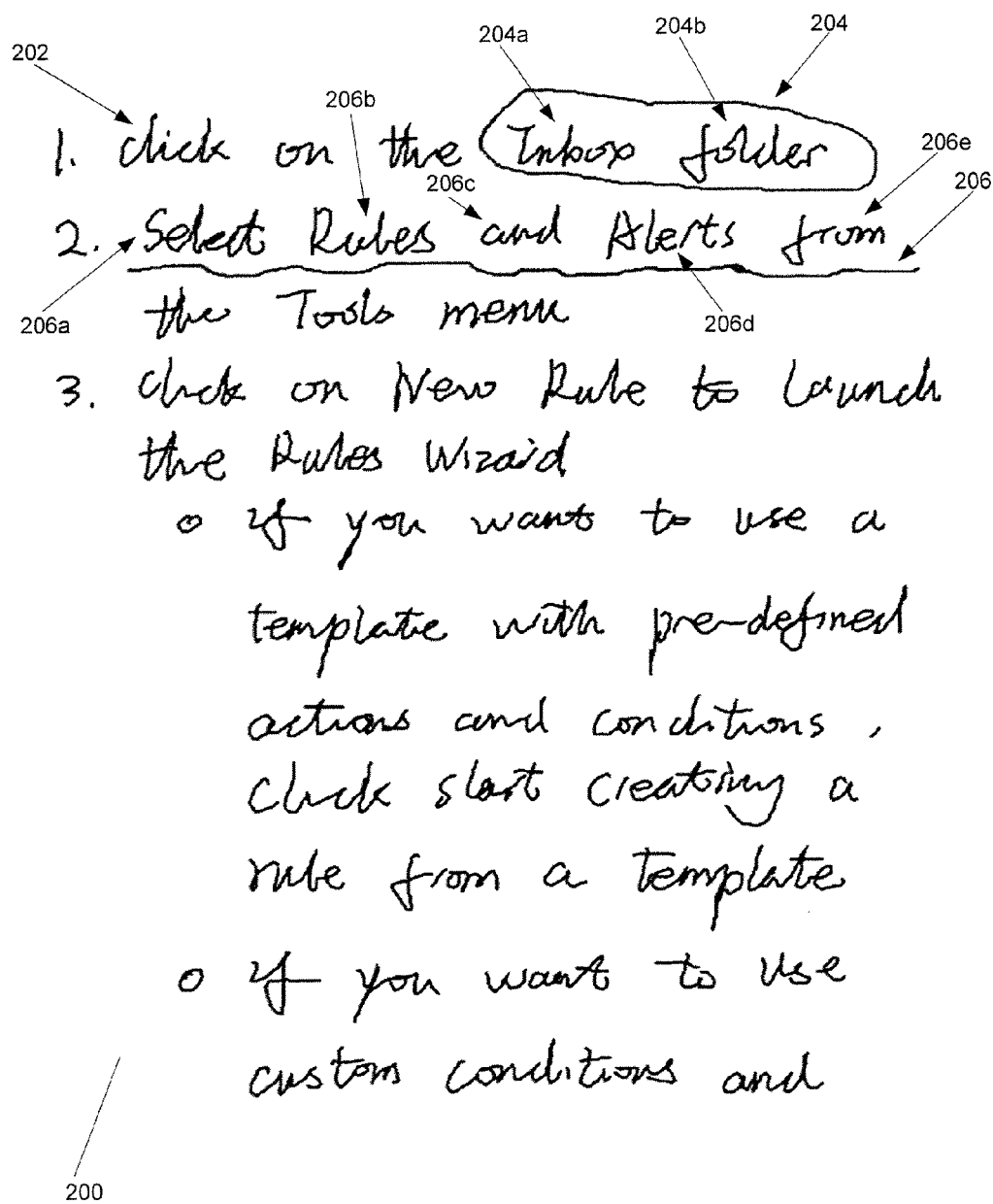
FIG. 2 shows an exemplary document that may be displayed on a computer device writing surface, in accordance with an embodiment of the invention.

FIG. 2 shows an exemplary document 200 that may be displayed on a computer device writing surface, such as a Tablet PC writing surface. In creating document 200, a user may use a pen to create digital ink strokes. The digital ink strokes are captured by the computer device and then displayed to the user. FIG. 2 shows that several digital ink strokes form words. For example, a group of digital ink strokes 202 form the word "click." Other digital ink strokes form annotations. Digital ink strokes 204 form a blob annotation that surrounds digital ink strokes that form the words "inbox" 204a and "folder" 204b. Digital ink strokes 206 form an underline annotation that is positioned below several word digital ink strokes that form the words "select" 206a, "rules" 206b, "and" 206c, "alerts" 206d" and "from" 206e.

Figure 3:
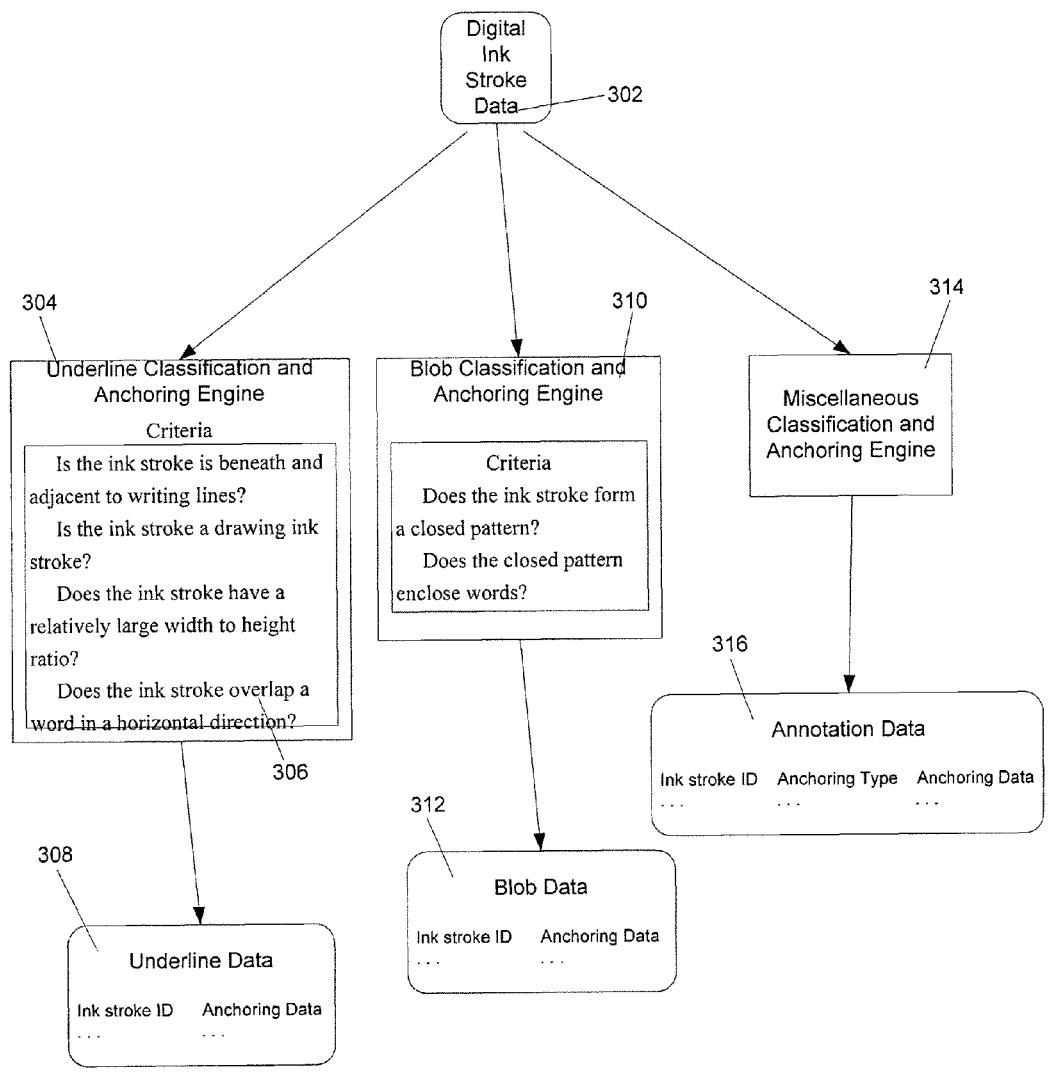
FIG. 3 illustrates a system that maybe used to classify and anchoring annotations. Digital ink stroke data may be delivered to one or more classification and anchoring engines, in accordance with an embodiment of the invention.

FIG. 3 illustrates a system that maybe used to classify and anchor annotations. Digital ink stroke data may be delivered to one or more classification and anchoring engines. Each digital ink stroke may be stored as one or more ink packets, in which each ink packet may contain coordinates (x, y) corresponding to the position of the pointing device. For example, a user may move a pen along a touch-sensitive display screen of a computer system so as to draw a line or curve, and the computer system may sample the coordinates (x, y) along the trajectory of the pen tip position over time (or on any other interval as known in the art) as the user moves the pen. These coordinates represent points along the curve or line and are stored as ink packets.

An underline classification and anchoring engine 304 may be configured to receive digital ink stroke data 302 and determine which ink strokes represent underline annotations. Underline classification and anchoring engine 304 may utilize a processor, computer-executable instructions and/or a rules engine configured to compare attributes of the ink strokes to underline annotation criteria 306. For example, underline classification and anchoring engine 304 may classify one or more ink strokes as representing an underline if the ink strokes are beneath and adjacent to writing lines. One skilled in the art will appreciate that various other methods exist for classifying digital ink strokes as word digital ink strokes. Other criteria may also be used to classify ink strokes as underline ink strokes. For example, underline classification and anchoring engine 304 may be configured to only consider ink strokes that are drawing ink strokes. Drawing ink strokes are those that do not have attributes of word ink strokes and are part of graphical objects.

Other criteria may include classifying an ink stroke as an underline ink stroke when the ink stroke has a relatively large width to height ratio or when the ink stroke overlaps a word in a horizontal direction. One skilled in the art will appreciate that additional, alternative and combinations of criteria may be used to classify an ink stroke as an underline ink stroke. Underline may also be composed of multiple strokes. Dynamic programming may be used to identify strokes that are part of the same underline annotation and determine when the search for strokes that are part of the same underline should end. This may include analyzing the features described above. It may then be determined if ink strokes close to one another form a single underline, for example, considering the proximity of the ink strokes.

Underline classification and anchoring engine 304 may also be configured to anchor underline annotations to words or other document elements. Anchoring may include associating one or more underline ink strokes with one or more word or other ink strokes. Underline data 308 may include an ink stroke identification that uniquely identifies the ink stroke and anchoring data that uniquely identifies the word ink strokes or other elements to which the annotation ink stroke is anchored.

Once annotation ink strokes are properly anchored, the document may be rearranged without loosing the annotations. For example, if a user underlines a segment of text and then moves the text segment to another part of the document, the annotation can be recreated at the new location. FIG. 4 shows a document 400 that is a modified version of document 200 (shown in FIG. 2). Words 206a, 206b, 206d, 206e and 204a have been moved from the positions they had in document 200. The movement may result from the user selecting one or more words 206a, 206b, 206d, 206e and 204a with a pointing device and dragging words 206a, 206b, 206d, 206e and 204a to their new locations. Underline annotation 402 was anchored to words 206a and 206b and underline annotation 404 was anchored to words 206d and 206e. A single underline annotation may be broken into two or more underline annotations. For example, in FIG. 2 underline annotation 206 is under words 206a-206e. When word "and" 206c is removed in FIG. 4 underline annotations 402 and 404 are formed under the remaining words. Similarly, blob annotation 204 is formed around words 204a and 204b in FIG. 2. When the word "folder" 204b is removed in FIG. 4, blob annotation 406 is formed only around the word "inbox" 204a. Of course, the size of a blob annotation may be reduced or increased to fit around a given collection of words.

The system shown in FIG. 3 also includes a blob classification and anchoring engine 310. Blob classification and anchoring engine 310 may be configured to operate in a manner similar to that of underline classification and anchoring engine 304. An exemplary criterion used to classify an ink stroke as a blob includes determining whether one or more ink strokes form a closed pattern. Of course, a "closed pattern" as used herein is meant to encompass a substantially enclosed pattern. Another criterion may include whether or not the closed pattern encloses words or other document elements. Blob classification and anchoring engine 308 may produce blob data 310.

One skilled in the art will appreciate that aspects of the invention may be used to classify and anchor other types of annotations, such as vertical brackets, call outs and highlighting. A miscellaneous classification and anchoring engine 314 is included in the system shown in FIG. 3 to show that the system may be adapted to classify and anchor other types of annotations and may produce annotation data 316. When miscellaneous classification and anchoring engine 314 is used to classify multiple types of annotations, annotation data 316 may include a field that identifies the type of annotation. Underline data 308 and blob data 312 may also include fields that identify the type of annotation.

Figure 5:
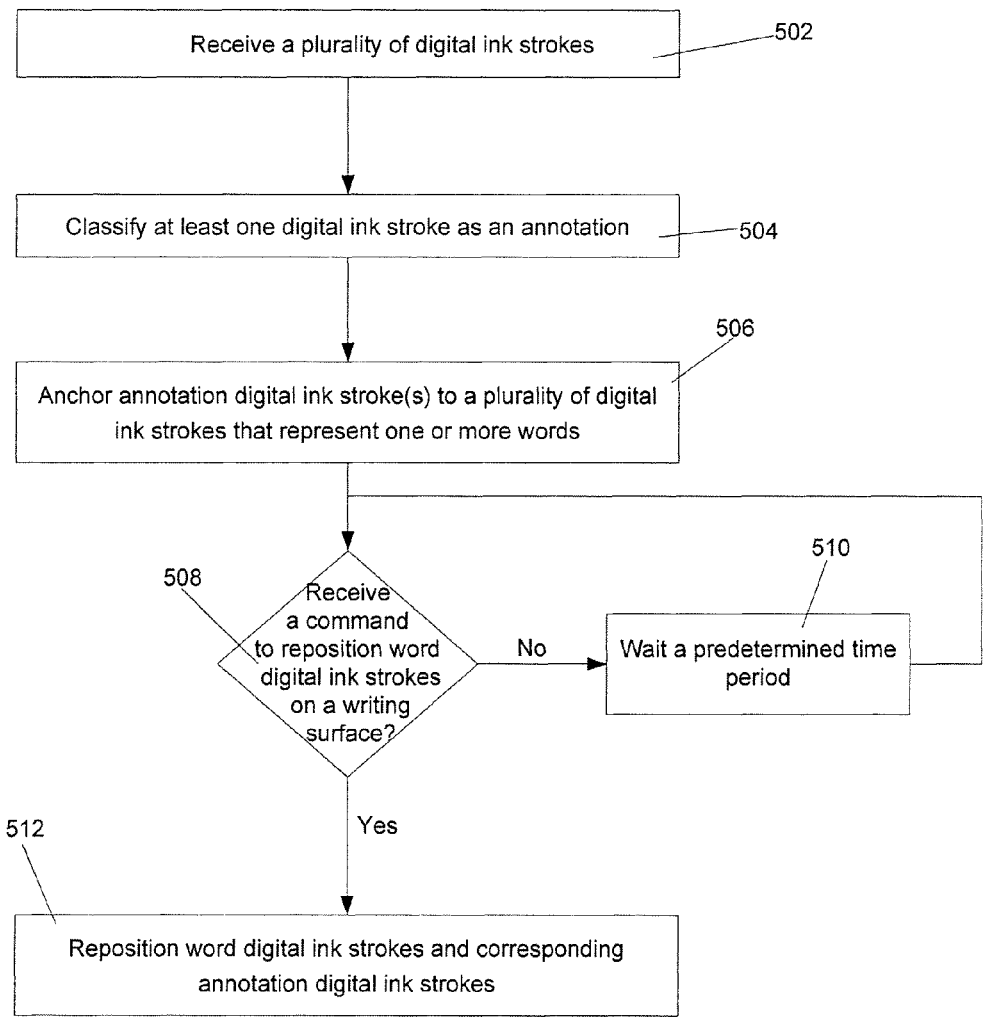
FIG. 5 illustrates a method of associating an annotation with one or more words represented by a plurality of digital ink strokes, in accordance with an embodiment of the invention.

FIG. 5 illustrates a method of associating an annotation with one or more words represented by a plurality of digital ink strokes. First, in step 502 a plurality of digital ink strokes are received. The digital ink strokes may be filtered so that they consist only of drawing inks strokes and/or are not words, images or other document elements. Next, in step 504 at least one digital ink stroke is classified as an annotation. They classification may use the criteria described above and may result in the digital ink stroke(s) being classified as an underline, blob or other type of annotation. After annotation digital ink strokes are identified, they are anchored to one or more digital ink strokes that represent one or more words in step 506. Next, it is determined whether a command to reposition word digital ink strokes on a writing surface are received in step 508. When a command is not received, in step 510 the process waits a predetermined time period before performing step 508 again. When a command is received, in step 512, the word digital ink strokes and anchored annotation digital ink strokes are repositioned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method of linking an annotation with annotated words represented by digital ink strokes, the method comprising:
   receiving a plurality of digital ink strokes;
   classifying at least some of the plurality of digital ink strokes as word digital ink strokes associated with words;
   classifying at least one of the plurality of digital ink strokes as the annotation;
   anchoring the at least one of the digital ink strokes of the annotation to a subset of the word digital ink strokes to create anchored word digital ink strokes that correspond to the annotated words that are annotated by and associated with the annotation;
   breaking the annotation into two separate annotations responsive to receiving a command to delete a portion of the annotated words that are between other portions of the annotated words, each of the two separate annotations maintaining an associated previously anchored portion of the anchored word digital ink strokes associated with annotated words that were not deleted;
   classifying a first of one or more digital ink strokes as a first of the two separate annotations and a second of one or more digital ink strokes as a second of the two separate annotations; and
   resizing the first and the second of the two separate annotations based on a size of the annotated words that were not deleted that are associated with the first and the second of the two separate annotations.

2. The method of claim 1, wherein the annotation comprises an underline.

3. The method of claim 1, wherein the annotation comprises a blob.

4. The method of claim 1, the method further comprising:
   receiving a command to reposition, on a writing surface, corresponding anchored word digital ink strokes associated with the first of the two separate annotations; and
   in response to receiving the command:
      repositioning the corresponding anchored word digital ink strokes;
      repositioning the first of one or more digital ink strokes to maintain correlation with the corresponding anchored word digital ink strokes;
      repositioning word digital ink strokes to accommodate the repositioning of the corresponding anchored word digital ink strokes; and
      reshaping the corresponding anchored word digital ink strokes and the first of one or more digital ink strokes to accommodate the repositioning.

5. The method of claim 1, the method further comprising:
   receiving a command to reposition, on a writing surface, corresponding anchored word digital ink strokes associated with the second of the two separate annotations; and in response to receiving the command:
repositioning the corresponding anchored word digital ink strokes;
repositioning the second of one or more digital ink strokes to maintain correlation with the corresponding anchored word digital ink strokes;
repositioning word digital ink strokes to accommodate the repositioning of the corresponding anchored word digital ink strokes; and
reshaping the corresponding anchored word digital ink strokes and the second of one or more digital ink strokes to accommodate the repositioning.

6. A computer-implemented method of associating an annotation with a sequence of adjacent words represented by a plurality of digital ink strokes on a writing surface, the method comprising:
classifying at least one digital ink stroke as an underline annotation;
anchoring the at least one digital ink stroke to the sequence of adjacent words represented by the plurality of digital ink strokes;
breaking the underline annotation into at least two separate underline annotations responsive to a user input that deletes at least one portion of the sequence of adjacent words being between other portions of the sequence of adjacent words, each of the at least two separate underline annotations maintaining an associated previously anchored portion of the sequence of adjacent words that were not deleted;
classifying at least one additional digital ink stroke as an underline annotation for each of the at least two separate underline annotations; and
responsive to a user input for repositioning an associated previously anchored portion of the sequence of adjacent words associated with a first of the at least two separate underline annotations, repositioning the associated previously anchored portion of the sequence of adjacent words associated with the first of the at least two separate underline annotations to a different position on the writing surface.

7. The method of claim 6, wherein the classifying comprises determining if the at least one ink stroke overlaps a word in a horizontal direction.

8. The method of claim 6, wherein the anchoring comprises associating ink stroke information that uniquely identifies, within a document, the at least one ink stroke to anchoring data associated with the sequence of adjacent words.

9. The method of claim 6, wherein the classifying comprises determining if the at least one ink stroke is beneath and adjacent to writing lines.

10. The method of claim 9, wherein the classifying comprises determining if the at least one ink stroke is a drawing stroke.

11. The method of claim 6, further comprising:
responsive to a user input that deletes a beginning or an ending portion of the sequence of adjacent words, reshaping a remaining portion of the sequence to include the underline annotation that corresponds to deletion of the portion of the sequence.

12. A computer-implemented method comprising:
classifying at least one digital ink stroke as a blob annotation, wherein the at least one digital ink stroke classified as the blob annotation forms a substantially closed pattern that encloses a sequence of adjacent words represented by a plurality of digital ink strokes intended for annotation;
anchoring the blob annotation to the sequence of adjacent words;
breaking the blob annotation into at least two separate resized blob annotations when a user input deletes at least one portion of the sequence of adjacent words being between other portions of the sequence of adjacent words, each of the at least two separate resized blob annotations maintaining an associated previously anchored portion of the sequence of adjacent words that were not deleted;
classifying at least one additional digital ink stroke as a blob annotation for each of the at least two separate resized blob annotations; and
responsive to a user input for repositioning, repositioning one or more of the at least two separate resized blob annotations and associated previously anchored portion of the sequence of adjacent words that were not deleted associated with the one or more of the at least two separate resized blob annotations.

13. The method of claim 12, wherein the classifying comprises determining if the substantially closed pattern encloses the sequence of adjacent words.

14. The method of claim 12, further comprising:
responsive to a user input that deletes a beginning or an ending portion of the sequence of adjacent words, reshaping the blob annotation to include a remaining portion of the sequence, the blob annotation being anchored to the remaining portion of the sequence.

15. A system for associating an annotation with a sequence of adjacent words represented by digital ink strokes, the system comprising:
a writing surface configured to digitally capture digital ink strokes;
a underline classification and anchoring engine coupled to the writing surface having a processor programmed with computer-executable instructions to perform acts comprising:
receiving a plurality of digital ink strokes;
classifying at least one of the digital ink strokes as an underline annotation by comparing attributes of the at least one of the plurality of ink strokes to underline annotation criteria;
anchoring the underline annotation to the sequence of adjacent words represented by the digital ink strokes;
responsive to a user input that deletes a portion of the sequence of adjacent words being between other portions of the sequence of adjacent words, breaking the underline annotation into at least two separate underline annotations, each of the at least two separate underline annotations maintaining an associated previously anchored portion of the sequence of adjacent words that were not deleted;
classifying at least one additional digital ink stroke as an underline annotation for each of the at least two separate underline annotations;
responsive to a user input for repositioning, repositioning one or more of the at least two separate underline annotations and the previously anchored portion of the sequence of adjacent words associated with the one or more of the at least two separate underline annotations to a different position on the writing surface; and
responsive to a user input that deletes a beginning or an ending portion of the sequence of adjacent words, reshaping the underline annotation to include a portion of the sequence that was not deleted.

16. The system of claim 15, further comprising a blob classification and anchoring engine coupled to the writing surface and programmed with computer-executable instructions to perform acts comprising:

receiving a plurality of digital ink strokes;

classifying at least one of the plurality of digital ink strokes as a blob annotation by determining if the at least one of the plurality of digital ink strokes forms a substantially closed pattern;

anchoring the blob annotation to the sequence of adjacent words represented by the digital ink strokes;

responsive to a user input that deletes a portion of the sequence of adjacent words being between other portions of the sequence of adjacent words, breaking the blob annotation into at least two separate blob annotations, each of the at least two separate blob annotations maintaining an associated portion of the sequence of adjacent words that were not deleted;

classifying at least one additional digital ink stroke as a blob annotation for each of the at least two separate blob annotations;

responsive to a user input for repositioning, repositioning one or more of the at least two separate blob annotations and the previously anchored portion of the sequence of adjacent words associated with the one or more of the at least two separate blob annotations to a different position on the writing surface; and responsive to a user input that deletes a beginning or an ending portion of the blob annotated sequence of adjacent words, reshaping the blob annotation to include a remaining portion of the blob annotated sequence.

17. The system of claim 15, wherein the classifying additionally comprises determining if the at least one ink stroke is a drawing stroke, wherein a drawing stroke is an ink stroke that has at least one attribute that is different from the attributes of word ink strokes.

18. The system of claim 16, wherein step of classifying comprises determining if the substantially closed pattern encloses the sequence of adjacent words.

\* \* \* \* \*